United States Patent
Katano

(10) Patent No.: US 9,829,674 B2
(45) Date of Patent: Nov. 28, 2017

(54) LENS BARREL AND IMAGE PICKUP APPARATUS

(71) Applicant: CANON KABUSHIKI KAISHA, Tokyo (JP)

(72) Inventor: Kenichi Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 14/954,150

(22) Filed: Nov. 30, 2015

(65) Prior Publication Data

US 2016/0161703 A1 Jun. 9, 2016

(30) Foreign Application Priority Data

Dec. 3, 2014 (JP) ................................. 2014-244906

(51) Int. Cl.
*G02B 15/14* (2006.01)
*G02B 7/02* (2006.01)
*G02B 7/10* (2006.01)

(52) U.S. Cl.
CPC .................................. *G02B 7/102* (2013.01)

(58) Field of Classification Search
CPC ........ G02B 7/10; G02B 1/102; G02B 15/173; G02B 3/00; G02B 25/001; G02B 7/021; G02B 7/02; G02B 7/023; G02B 7/04; G02B 7/08; G11B 7/0932; G11B 7/0935
USPC ....... 359/704, 703, 694, 676, 642–643, 647, 359/811–830; 396/76, 77, 79, 83
See application file for complete search history.

(56) References Cited

U.S. PATENT DOCUMENTS

| | | | |
|---|---|---|---|
| 2014/0204482 A1* | 7/2014 | Izumi | G02B 7/102 359/817 |
| 2015/0234146 A1* | 8/2015 | Nishitani | G02B 7/023 359/813 |
| 2015/0248018 A1* | 9/2015 | Hung | G02B 27/646 359/557 |

FOREIGN PATENT DOCUMENTS

| | | |
|---|---|---|
| JP | 2006-251651 A | 9/2006 |
| JP | 5482129 B2 | 4/2014 |

* cited by examiner

*Primary Examiner* — Dawayne A Pinkney
(74) *Attorney, Agent, or Firm* — Fitzpatrick, Cella, Harper & Scinto

(57) ABSTRACT

A lens barrel capable of maintaining a pivot regulating function of the lens holder even if a forceful impact is received from outside. A lens holder holds a lens and is movable in an optical axis direction. A fixing member supports both ends of a first guide shaft for guiding the lens holder in the optical axis direction and supports a second guide shaft in a cantilever manner. The second guide shaft is shorter than the first guide shaft and regulates a pivot of the lens holder on the first guide shaft by engaging with the lens holder. A pivot regulating mechanism is disposed between a wall portion of the fixing member that supports one end of the first guide shaft and the lens holder. The mechanism regulates the pivot of the lens holder in a case where engagement between the lens holder and the second guide shaft is released.

9 Claims, 19 Drawing Sheets

LENS BARREL AND IMAGE PICKUP APPARATUS

BACKGROUND OF THE INVENTION

Field of the Invention

The invention relates to a lens barrel installed in an image pickup apparatus, such as a digital camera, and relates to an image pickup apparatus provided with the lens barrel.

Description of the Related Art

Some image pickup apparatuses, such as a digital camera, are provided with a zoom lens barrel that changes photographing magnification by moving a plurality of lenses in an optical axis direction. Such a lens barrel moves lens holders that respectively hold the plurality of lenses in the optical axis direction with regulating pivots of the lens holders by combining a plurality of rectilinear barrels and rotating barrels. Moreover, the lens barrel is housed in the apparatus body at the time of retraction, which thins the thickness of the image pickup apparatus in the optical axis direction.

There are proposed mechanisms that guide lens holders holding lenses along two guide bars extending in the optical axis direction (Japanese Laid-Open Patent Publication (Kokai) No. 2006-251651 (JP 2006-251651A) and Japanese Patent Publication No. 5482129 (JP 5482129B)). In these proposed mechanisms, a fitting hole and a U-shaped slot are formed in a lens holder. The fitting hole is fitted to a first guide bar so as to be slidable in the optical axis direction. The U-shaped slot is engaged with a second guide bar so as to be slidable in the optical axis direction and to function as a pivot stopper.

However, the mechanisms disclosed in the above-mentioned publications have possibility that the lens holder falls from the second guide bar because a forceful impact from outside may take the U-shaped slot of the lens holder off the second guide bar and release the function of the pivot stopper.

SUMMARY OF THE INVENTION

The invention provides a lens barrel with excellent impact resistance that prevents a lens holder from falling by maintaining the function of the pivot stopper of the lens holder even if a forceful impact is received from outside.

Accordingly, a first aspect of the invention provides a lens barrel comprising a lens holder that holds a lens and that is movable in an optical axis direction, a fixing member that supports both ends of a first guide shaft for guiding the lens holder in the optical axis direction and that supports a second guide shaft in a cantilever manner, the second guide shaft being shorter than the first guide shaft and regulating a pivot of the lens holder on the first guide shaft by engaging with the lens holder, and a pivot regulating mechanism that is disposed between a wall portion of the fixing member that supports one end of the first guide shaft and the lens holder, and that is configured to regulate the pivot of the lens holder on the first guide shaft in a case where engagement between the lens holder and the second guide shaft is released.

Accordingly, a second aspect of the invention provides an image pickup apparatus equipped with the lens barrel of the first aspect.

According to the invention, a lens barrel with excellent impact resistance that prevents a lens holder from falling by maintaining the function of the pivot stopper of the lens holder even if a forceful impact is received from outside is provided.

Further features of the invention will become apparent from the following description of exemplary embodiments with reference to the attached drawings.

DESCRIPTION OF THE EMBODIMENTS

Hereafter, embodiments according to the invention will be described in detail with reference to the drawings.

Figure 1:
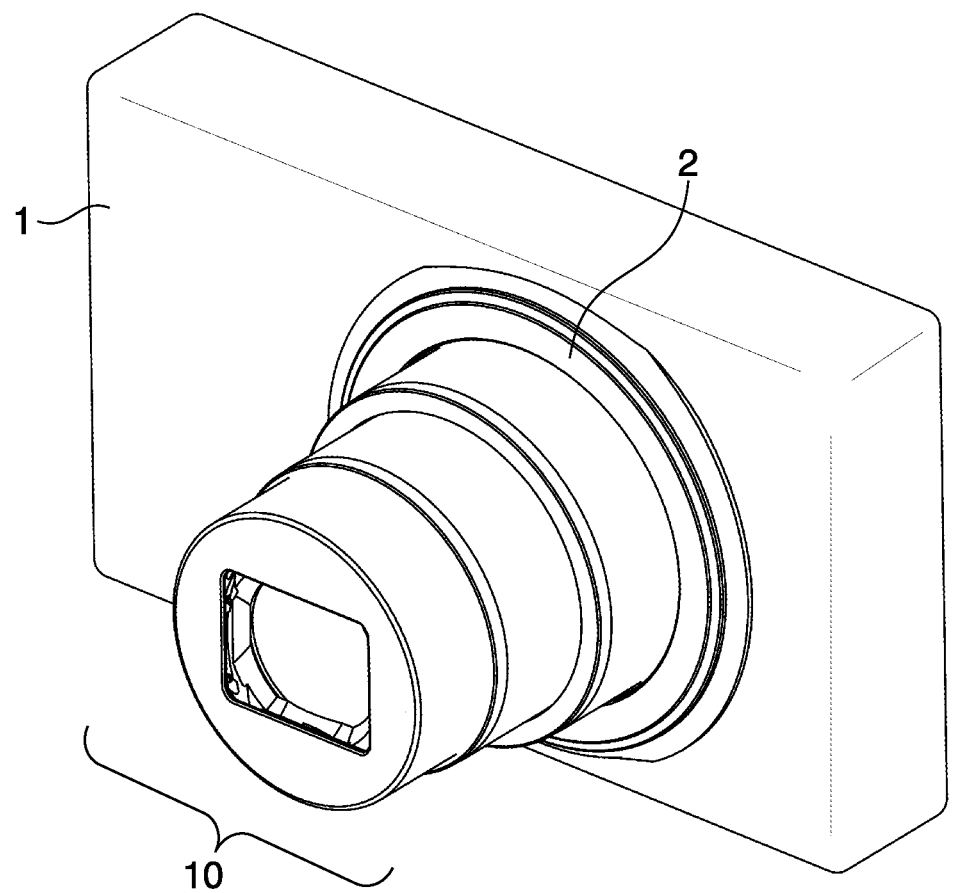
FIG. 1 is a perspective view of a digital camera viewed from a front side (an object side) according to a first embodiment of an image pickup apparatus that is provided with a lens barrel of the invention.
Figure 2:
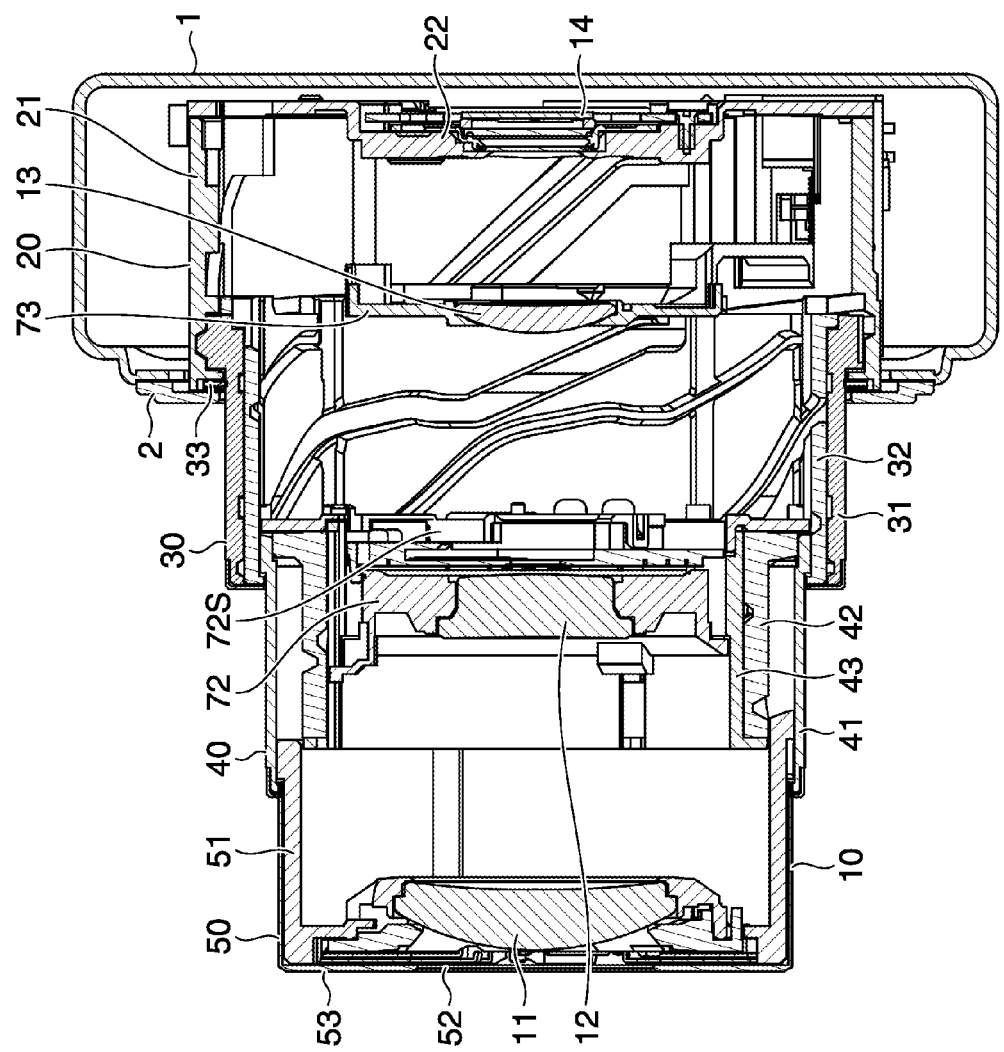
FIG. 2 is a sectional view of the digital camera shown in FIG. 1 under a condition where the lens barrel is extended to a photographing position.
Figure 3:
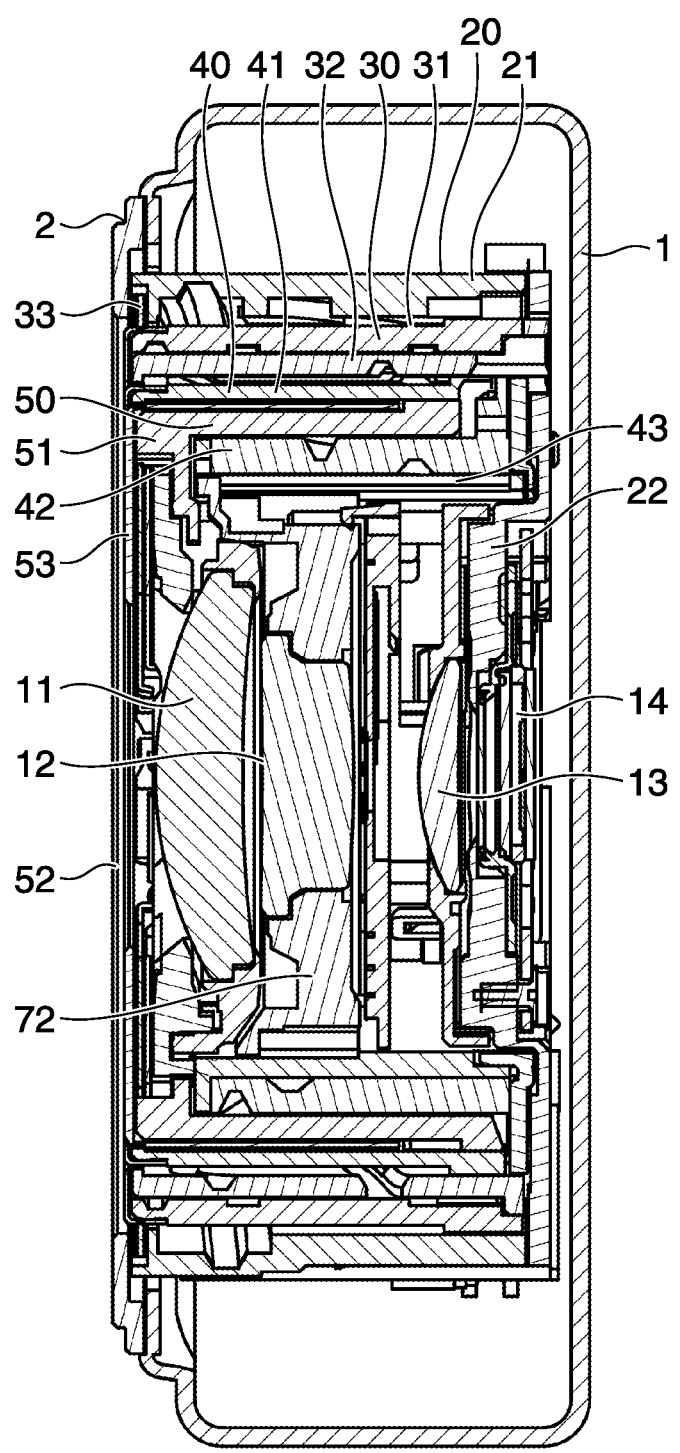
FIG. 3 is a sectional view of the digital camera shown in FIG. 1 under a condition where the lens barrel is withdrawn to a collapsed position.
Figure 4:
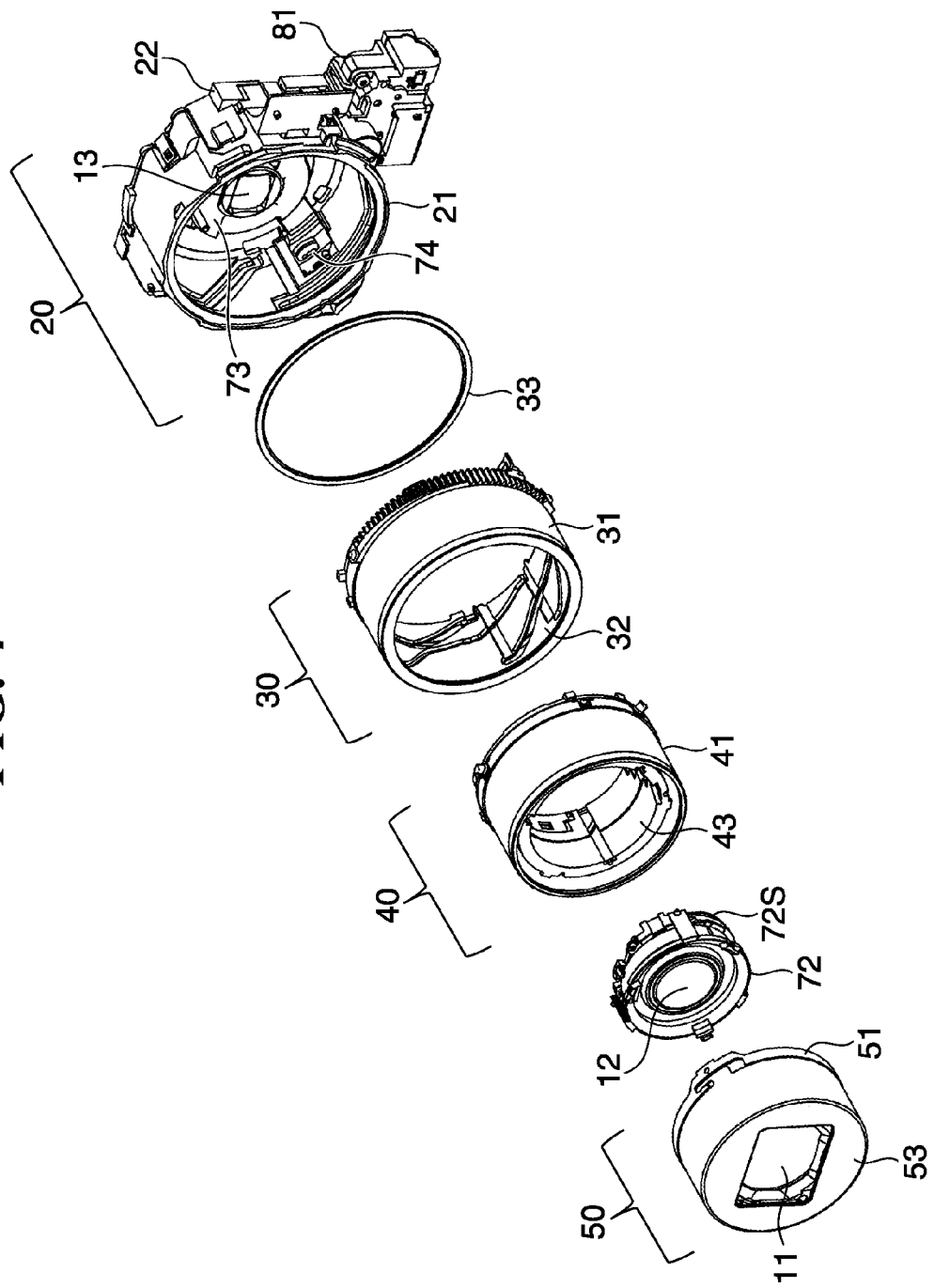
FIG. 4 is an exploded perspective view of the lens barrel.
Figure 5:
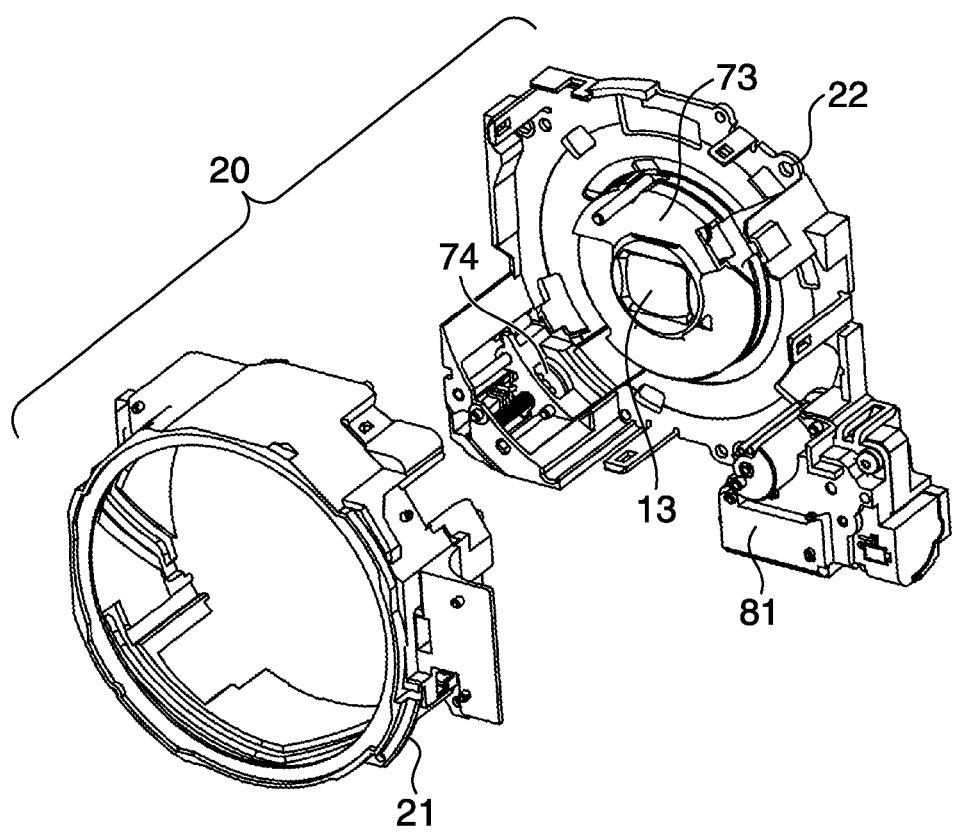
FIG. 5 is an exploded perspective view of a fixed barrel unit of the lens barrel shown in FIG. 4.

FIG. 1 is a perspective view of a digital camera viewed from a front side (an object side) according to a first embodiment of an image pickup apparatus that is provided with a lens barrel of the invention. FIG. 2 is a sectional view of the digital camera shown in FIG. 1 under a condition where the lens barrel is extended to a photographing position. FIG. 3 is a sectional view of the digital camera shown in FIG. 1 under a condition where the lens barrel is withdrawn to a collapsed position. FIG. 4 is an exploded perspective view of the lens barrel. FIG. 5 is an exploded perspective view of a fixed barrel unit of the lens barrel shown in FIG. 4.

As shown in FIG. 1 to FIG. 3, the digital camera of this embodiment has a zoom lens barrel 10 at a front side of a camera body 1, and a decorative ring 2 is arranged around the lens barrel 10 of the camera body 1. The lens barrel 10 is provided with a fixed barrel unit 20, a first cam barrel unit 30, a second cam barrel unit 40, and a first group barrel unit 50 as illustrated in FIG. 2 to FIG. 4.

The fixed barrel unit 20 has a fixed barrel 21 and a sensor holder 22 that holds an image pickup device 14. A gear box 81 and an AF motor unit 74 are provided in the sensor holder 22. A motor that is a zoom driving source and a transmission gear that is rotated by the motor are stored in the gear box 81. The sensor holder 22 is equivalent to an example of the fixing member of the invention.

When the fixed barrel 21 and the sensor holder 22 are coupled, rotation of the transmission gear in the gear box 81 can be transferred to a first cam barrel 31 mentioned later. The AF motor unit 74 drives a third group holder 73 that holds a third group lens 13 in an optical axis direction. The third group holder 73 is equivalent to an example of the lens holder of the invention, and the third group lens 13 is constituted by a focus lens in this embodiment.

The first cam barrel unit 30 has a first cam barrel 31 and a first rectilinear barrel 32. A shading sheet 33 is provided between the first cam barrel unit 30 and the fixed barrel unit 20. The shading sheet 33 closes a gap between an outer surface of the first cam barrel 31 and an inner surface of the fixed barrel 21.

The second cam barrel unit 40 has a cover barrel 41, a second cam barrel 42, and a second rectilinear barrel 43. A second group holder 72 that holds a second group lens 12 is provided inside the second rectilinear barrel 43 so as to be movable in the optical axis direction while the rotation around the optical axis is regulated. Moreover, a shutter unit 72S is mounted on the second group holder 72.

The first group barrel unit 50 has a first group barrel 51, barrier blades 52, and a first group cover 53. The first group barrel 51 holds a first group lens 11, and is provided so as to be movable in the optical axis direction while the rotation is regulated.

The lens barrel 10 with the above-mentioned configuration moves a plurality of lenses that constitute an image pickup optical system in the optical axis direction between a collapsed position (FIG. 3) and a photographing position (FIG. 2). In the photographing position, the first group barrel 51 that holds the first group lens 11 and the second group holder 72 that holds the second group lens 12 are driven in the optical axis direction to change photographing magnification, and the third group holder 73 that holds the third group lens 13 is driven in the optical axis direction to perform a focusing operation.

Figure 6:
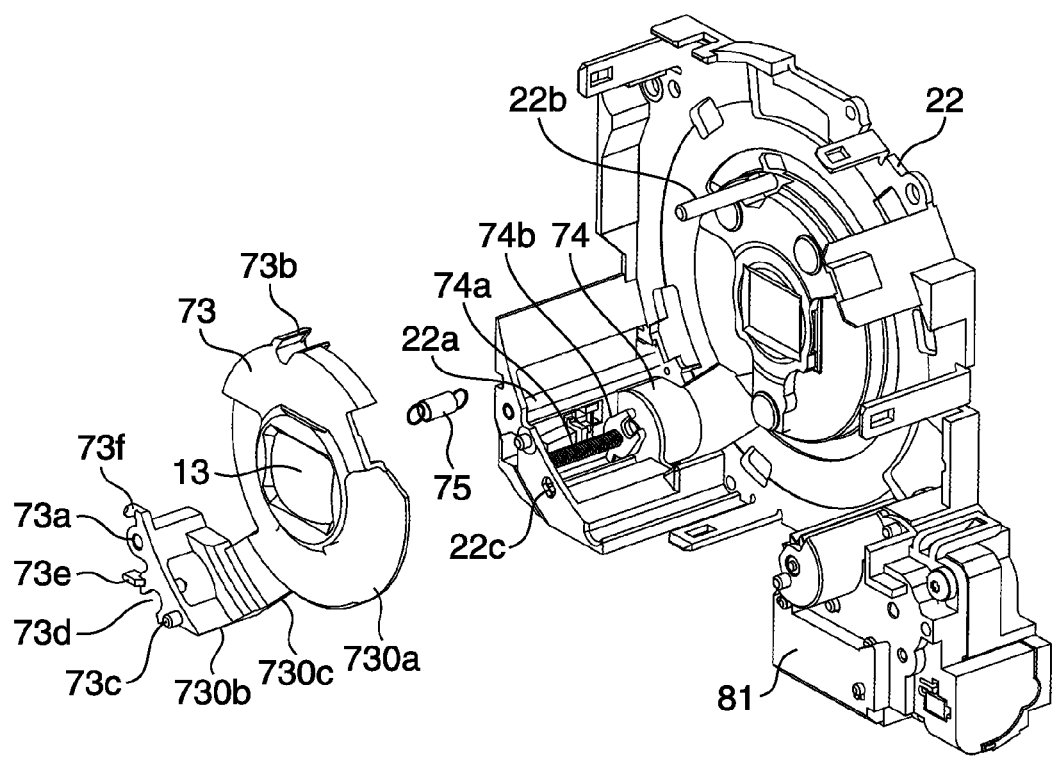
FIG. 6 is a perspective view of a sensor holder and a third group holder of the lens barrel shown in FIG. 4.
Figure 7:
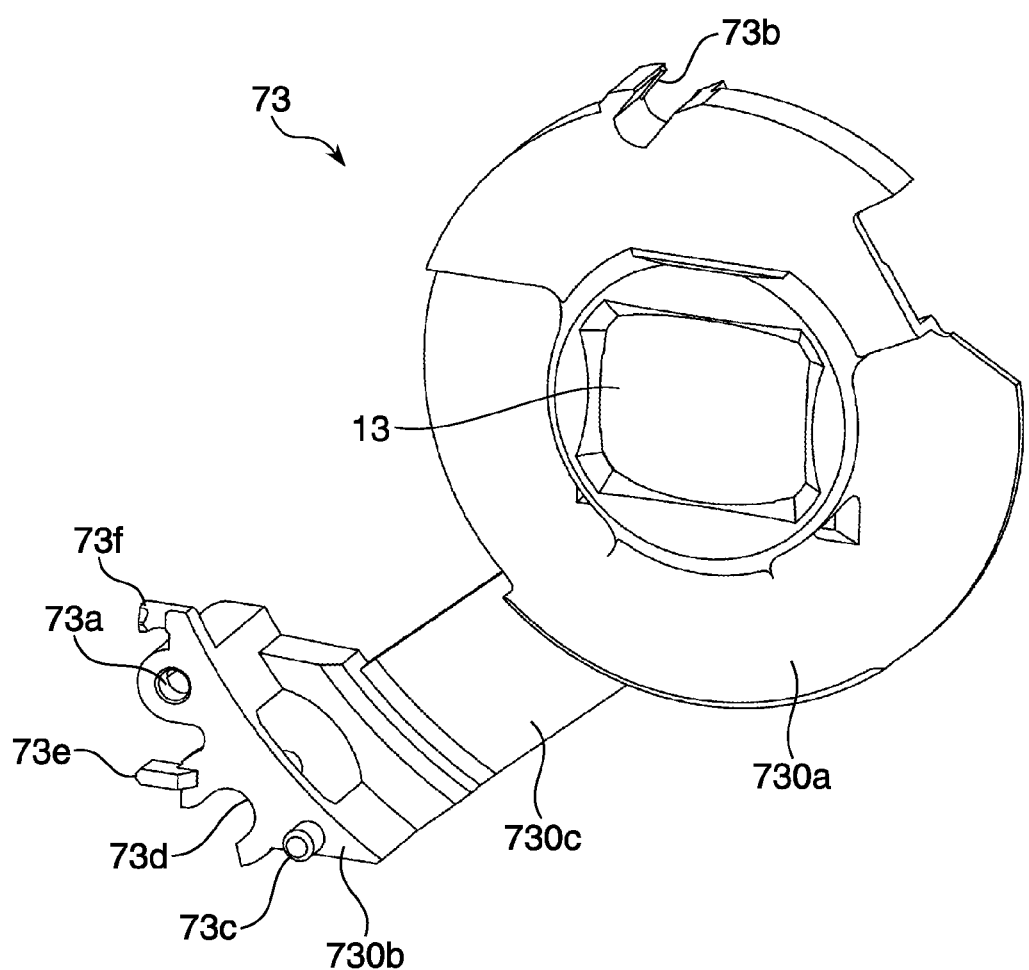
FIG. 7 is an enlarged perspective view of the third group holder.

FIG. 6 is a perspective view of the sensor holder 22 and the third group holder 73. FIG. 7 is an enlarged perspective view of the third group holder 73.

As illustrated in FIG. 6 and FIG. 7, the third group holder 73 has a lens holding member 730a that holds the third group lens 13, a shaft holding portion 730b, and an arm 730c that connects an outer periphery of the lens holding member 730a with the shaft holding portion 730b. The shaft holding portion 730b is held by a first guide shaft 22a disposed on the sensor holder 22, and is arranged outside the fixed barrel 21 that has the maximum diameter of the lens barrel 10 in a radial direction.

The first guide shaft 22a of which both ends are supported by the sensor holder 22 is fitted in a fitting hole 73a in the shaft holding portion 730b. As a result, the third group holder 73 is guided along the first guide shaft 22a in the optical axis direction. Moreover, a shaft 73c, a shading plate 73e, a nut abutting portion 73d, and a spring hook portion 73f are provided in the shaft holding portion 730b. A spring 75 that energizes the third group holder 73 toward the rear side (an image surface side), i.e., the side of the sensor holder 22 is hooked to the spring hook portion 73f. The shading plate 73e is used for a photo interrupter (not shown).

Moreover, a screw shaft 74a is integrally provided with a motor shaft of the AF motor unit 74 on the sensor holder 22, and a nut 74b is screwed to the screw shaft 74a. The rotation of the screw shaft 74a moves the nut 74b along the screw shaft 74a in the optical axis direction.

Then, when the nut 74b moves to the front side in the optical axis direction, the nut 74b abuts to the nut abutting portion 73d of the shaft holding portion 730b, and pushes the nut abutting portion 73d toward the front side. This moves the third group holder 73 to the front side in the optical axis direction. When the nut 74b moves to the back side in the optical axis direction, the third group holder 73 moves to the back side in the optical axis direction according to the energization force of the spring 75.

A concave pivot regulating engagement portion 73b is provided in the outer periphery of the lens holding member 730a. A second guide shaft 22b that is projected from an image-pickup-device holding portion of the sensor holder 22 in the optical axis direction and is supported in a cantilever manner is engaged to the pivot regulating engagement portion 73b. Accordingly, the pivot of the third group holder 73 on the first guide shaft 22a of the sensor holder 22 is regulated. The second guide shaft 22b is shorter than the first guide shaft 22a.

Moreover, the pivot regulating engagement portion 73b is arranged in a position that is approximately opposite to the fitting hole 73a in the radial direction of the lens holding member 730a. Accordingly, since a long distance is kept between the pivot regulating engagement portion 73b and the fitting hole 73a, the pivot regulating effect by the pivot regulating engagement portion 73b and the second guide shaft 22b is improved.

Figure 8:
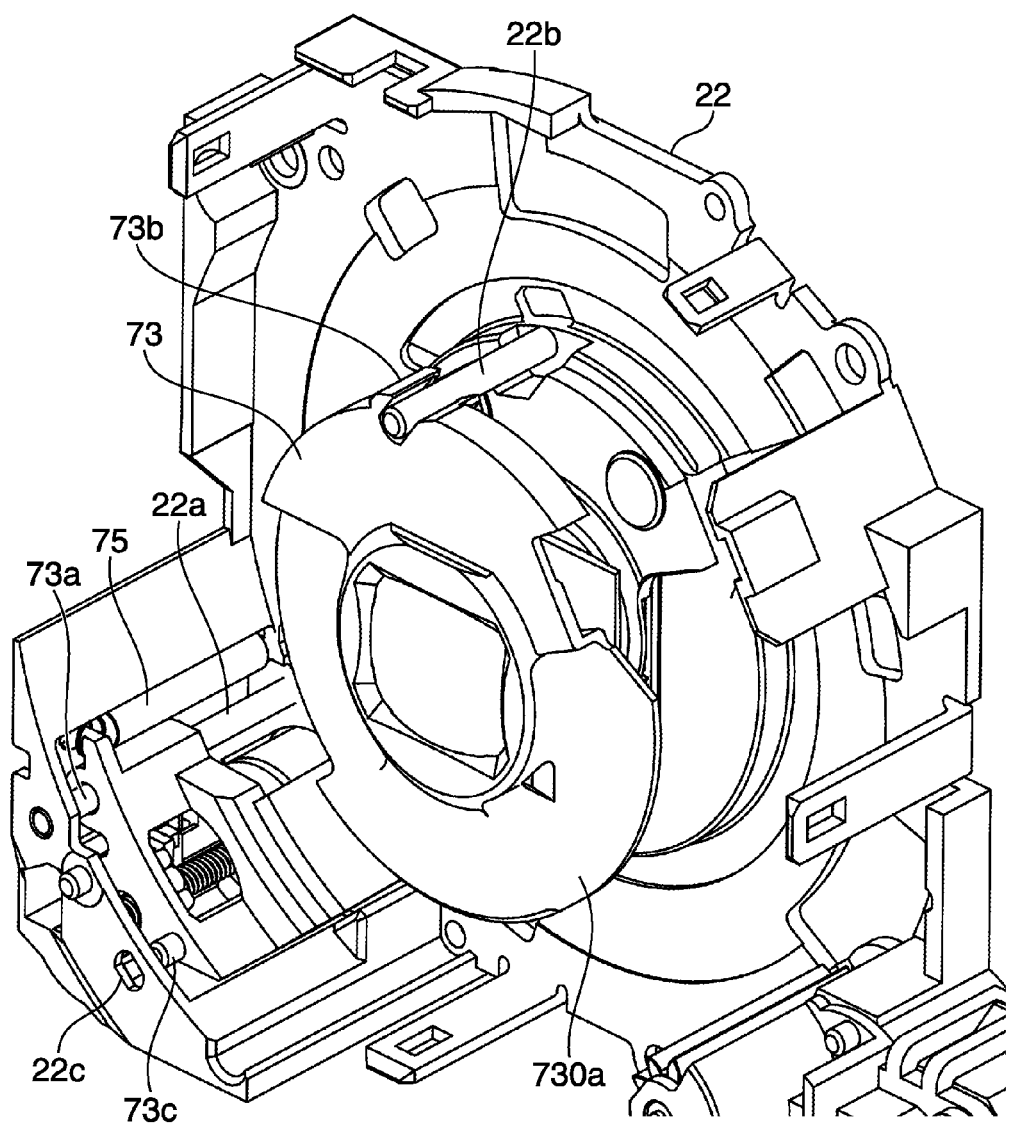
FIG. 8 is a perspective view showing a condition where the third group holder is most extended with respect to the sensor holder in the photographing position.

FIG. 8 is a perspective view showing a condition where the third group holder 73 is most extended with respect to the sensor holder 22 in the photographing position. At the time of usual photographing, the third group holder 73 moves between a withdrawn end (a collapsed position) and the extended edge shown in FIG. 8.

Figure 9:
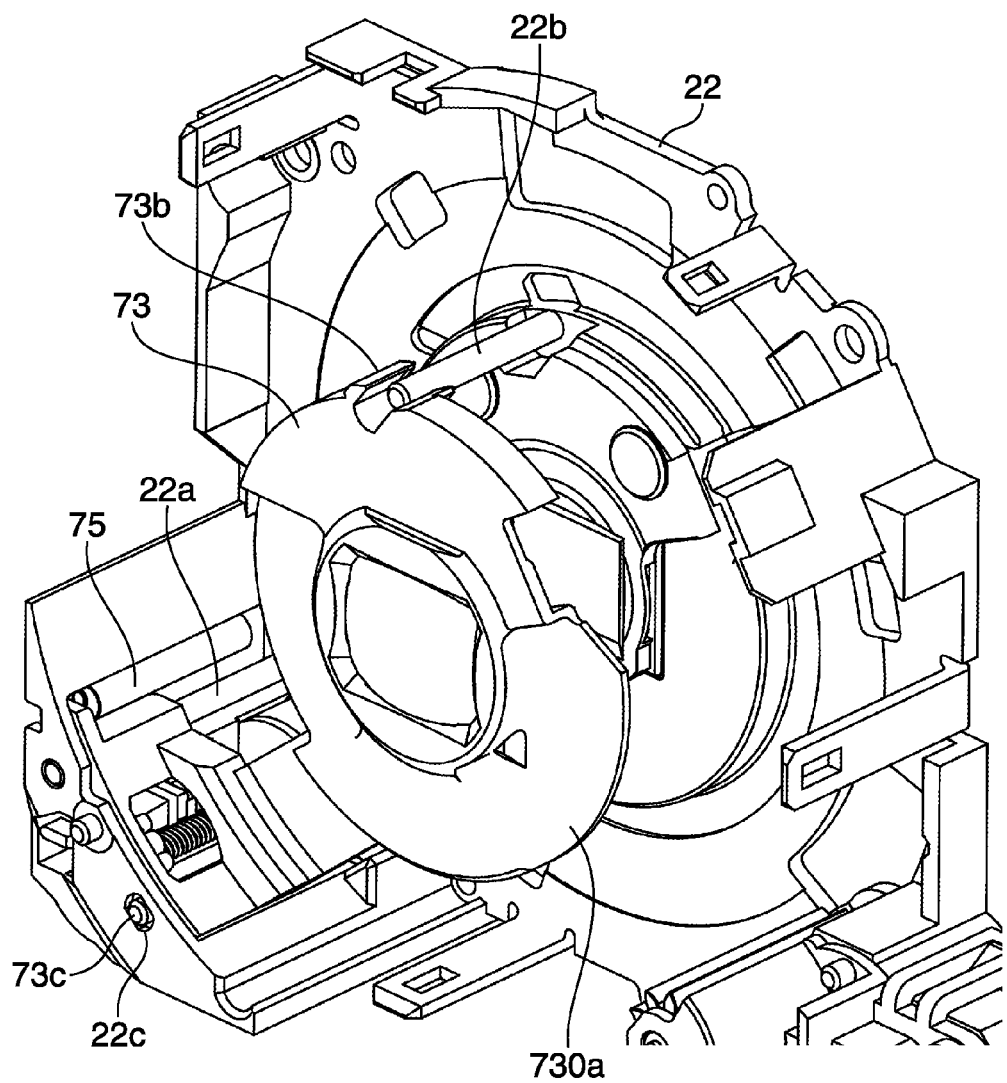
FIG. 9 is a perspective view showing a condition where the third group holder further moves to an extension side from the condition shown in FIG. 8 and runs against an extended edge.

FIG. 9 is a perspective view showing a condition where the third group holder 73 further moves to the extension side from the condition shown in FIG. 8 and runs against the extended edge. The condition shown in FIG. 9 occurs, when an impact toward the object side in the optical axis direction is applied to the camera body 1 under the condition shown in FIG. 8, for example.

Figure 10:
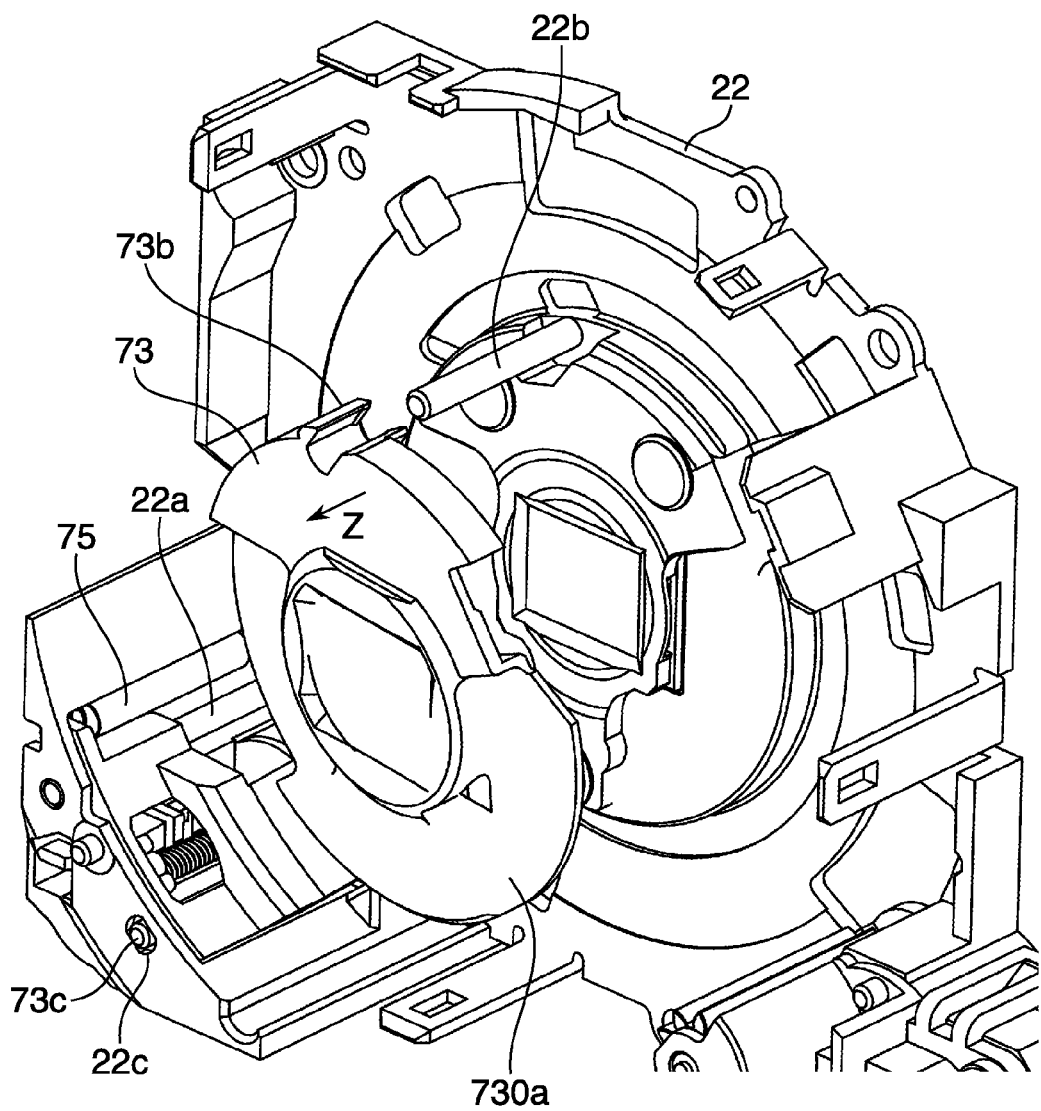
FIG. 10 is a perspective view showing a condition where a pivot regulating engagement portion of the third group holder comes off a second guide shaft of the sensor holder.

FIG. 10 is a perspective view showing a condition where the pivot regulating engagement portion 73b of the third group holder 73 comes off the second guide shaft 22b of the sensor holder 22. The condition shown in FIG. 10 occurs, when an impact larger than the impact that causes the condition in FIG. 9 toward the object side in the optical axis direction is applied to the camera body 1 in the condition shown in FIG. 8, for example.

Under the condition shown in FIG. 10, since a portion near the pivot regulating engagement portion 73b apart from the fitting hole 73a of the third group holder 73 elastically deforms and bends in a direction of an arrow Z in FIG. 10, the engagement between the pivot regulating engagement portion 73b and the second guide shaft 22b is released, and the pivot regulating engagement portion 73b comes off. Accordingly, the pivot regulating function by the pivot regulating engagement portion 73b and the second guide shaft 22b is invalid.

In this embodiment, the shaft 73c on the shaft holding portion 730b of the third group holder 73 is inserted into a regulation hole 22c formed in a wall portion that supports the front end of the first guide shaft 22a of the sensor holder 22 under the conditions in FIG. 9 and FIG. 10.

Accordingly, even when the pivot regulating function by the pivot regulating engagement portion 73b and the second guide shaft 22b is invalid as shown in FIG. 10, the pivot of the third group holder 73 with respect to the sensor holder 22 is regulated. Accordingly, since the third group holder 73 does not rotate even if the pivot regulating engagement portion 73b comes off the second guide shaft 22b, the third group holder 73 can be returned to the former position (the position shown in FIG. 8) when the deformation of the third group holder 73 is converged.

Figure 11:
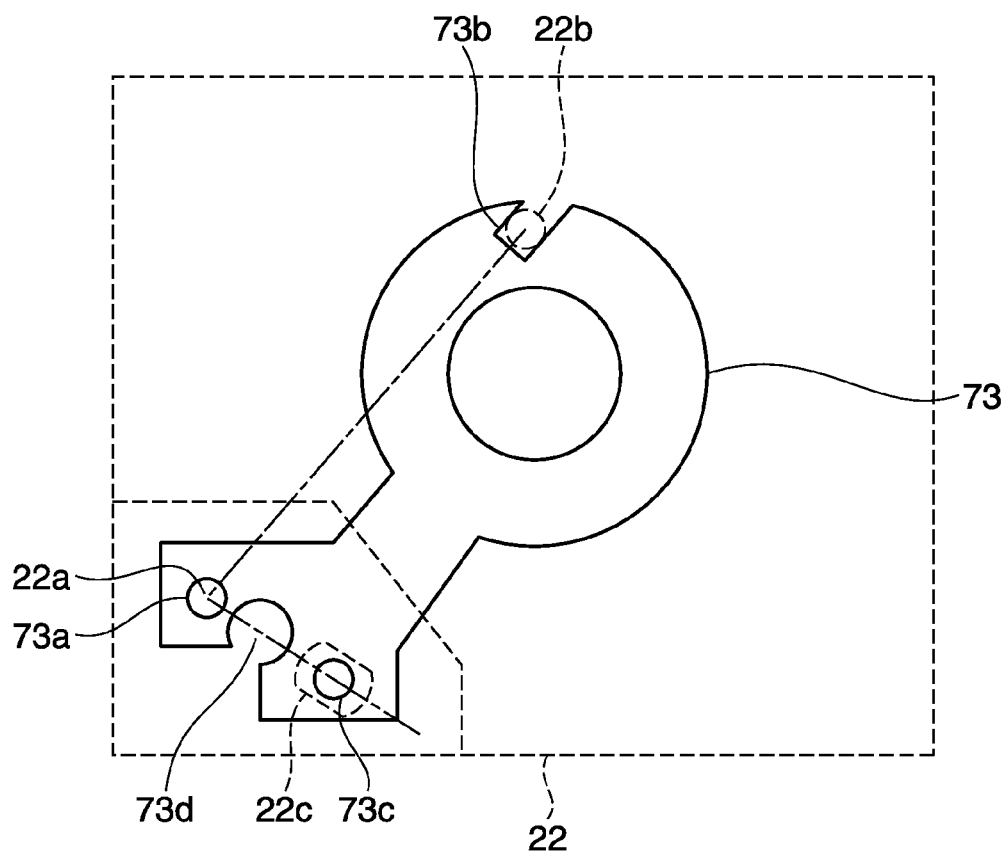
FIG. 11 is a schematic view showing a relation between the sensor holder and the third group holder viewed from the front side.

FIG. 11 is a schematic view showing a relation between the sensor holder 22 and the third group holder 73 viewed from the front side. As shown in FIG. 11, the second guide shaft 22b that regulates the pivot of the third group holder 73 at the time of usual photographing is formed as a shaft with a circular section, and the pivot regulating engagement portion 73b is formed as a concave portion with a rectangular section of which width is approximately identical to the diameter of the second guide shaft 22b.

On the other hand, the shaft 73c, which regulates the pivot of the third group holder 73 when the pivot regulating engagement portion 73b comes off the second guide shaft 22b, is inserted into the regulation hole 22c with a proper gap. This aims to avoid double fitting of the second guide shaft 22b and the shaft 73c to the pivot regulating engagement portion 73b and the regulation hole 22c.

Figure 12:
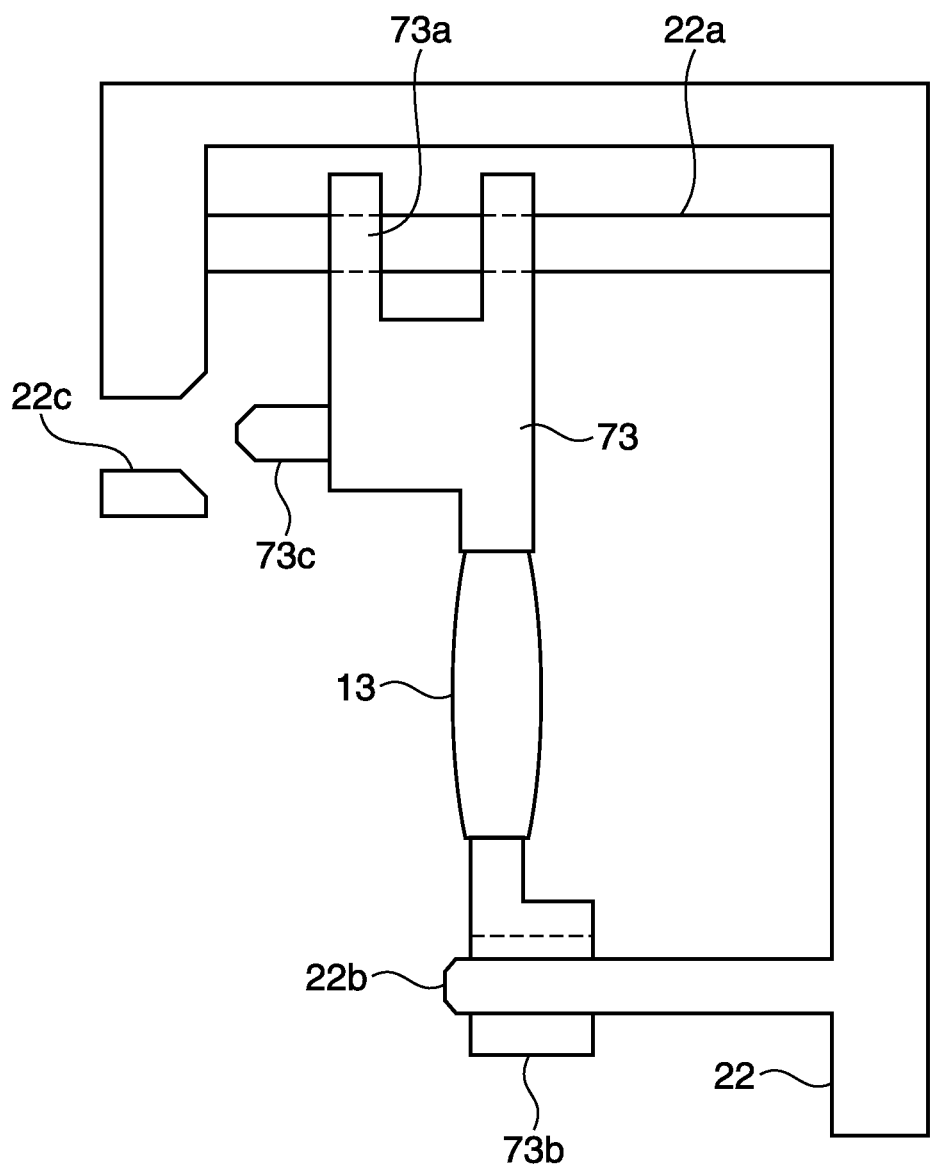
FIG. 12 is a schematic view showing a condition where the third group holder is most extended with respect to the sensor holder in the photographing position viewed from a lateral side.
Figure 13:
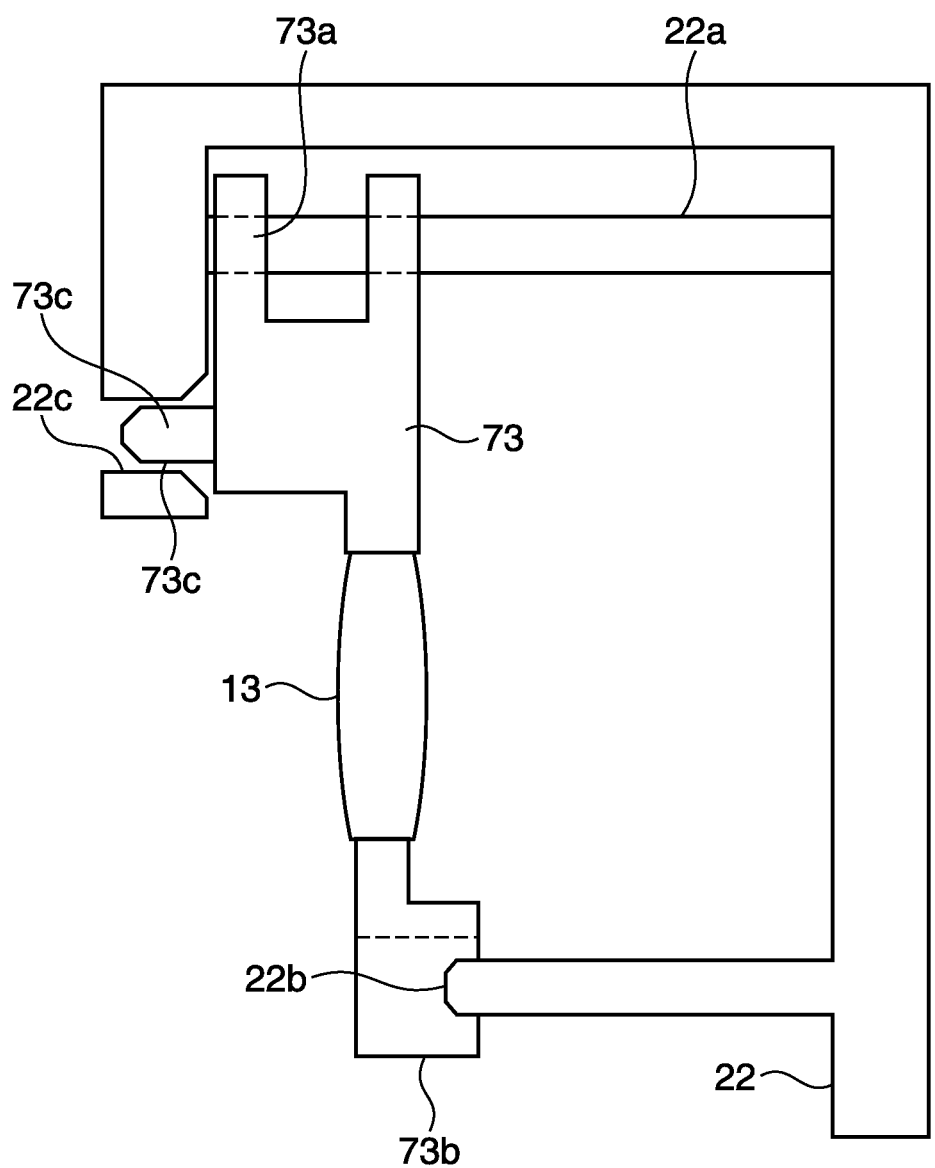
FIG. 13 is a schematic view showing a condition where the third group holder further moves to the extension side from the condition shown in FIG. 12 and runs against the extended edge viewed from the lateral side.

FIG. 12 is a schematic view showing a condition where the third group holder 73 is most extended with respect to the sensor holder 22 in the photographing position viewed from a lateral side, and corresponds to the condition in FIG. 8. FIG. 13 is a schematic view showing a condition where the third group holder 73 further moves to the extension side from the condition shown in FIG. 12 and runs against the extended edge viewed from the lateral side, and corresponds to the condition in FIG. 9.

Under the condition shown in FIG. 12, the pivot of the third group holder 73 is regulated by only the engagement of the pivot regulating engagement portion 73b with the second guide shaft 22b. Moreover, under the condition shown in FIG. 13, the pivot of the third group holder 73 is regulated by not only the engagement of the pivot regulating engagement portion 73b with the second guide shaft 22b, but also the engagement of the shaft 73c with the regulation hole 22c.

Then, even when a forcible impact applied elastically deforms a portion near the pivot regulating engagement portion 73b and the pivot regulating engagement portion 73b comes off the second guide shaft 22b (see FIG. 10), the pivot of the third group holder 73 is regulated by the engagement of the shaft 73c with the regulation hole 22c. This prevents the third group holder 73 from falling. After the deformation of the third group holder 73 is converged, the third group holder 73 can be returned to the former position (the position in FIG. 8) as mentioned above.

Moreover, the gap between the regulation hole 22c and the shaft 73c is set up so that the pivot regulating engagement portion 73b can be fitted to the second guide shaft 22b even if the third group holder 73 is moved by the gap due to a forcible impact in the pivoting direction under the condition where the pivot regulating engagement portion 73b comes off the second guide shaft 22b. Furthermore, since a chamfer is formed at the tip end of the second guide shaft 22b, the second guide shaft 22b is smoothly inserted to the pivot regulating engagement portion 73b when the third group holder 73 returns to the former position (the position in FIG. 8).

As mentioned above, this embodiment provides the lens barrel with excellent impact resistance that prevents the third group holder 73 from falling by maintaining the function of the pivot stopper of the third group holder 73 even if a forceful impact is received from outside.

Next, a digital camera according to a second embodiment of an image pickup apparatus equipped with the lens barrel of the invention will be described with reference to FIG. 14 to FIG. 16. It should be noted that sections duplicated or corresponding to sections in the above-mentioned first embodiment will be described by applying the same numerals in the drawings.

Figure 14:
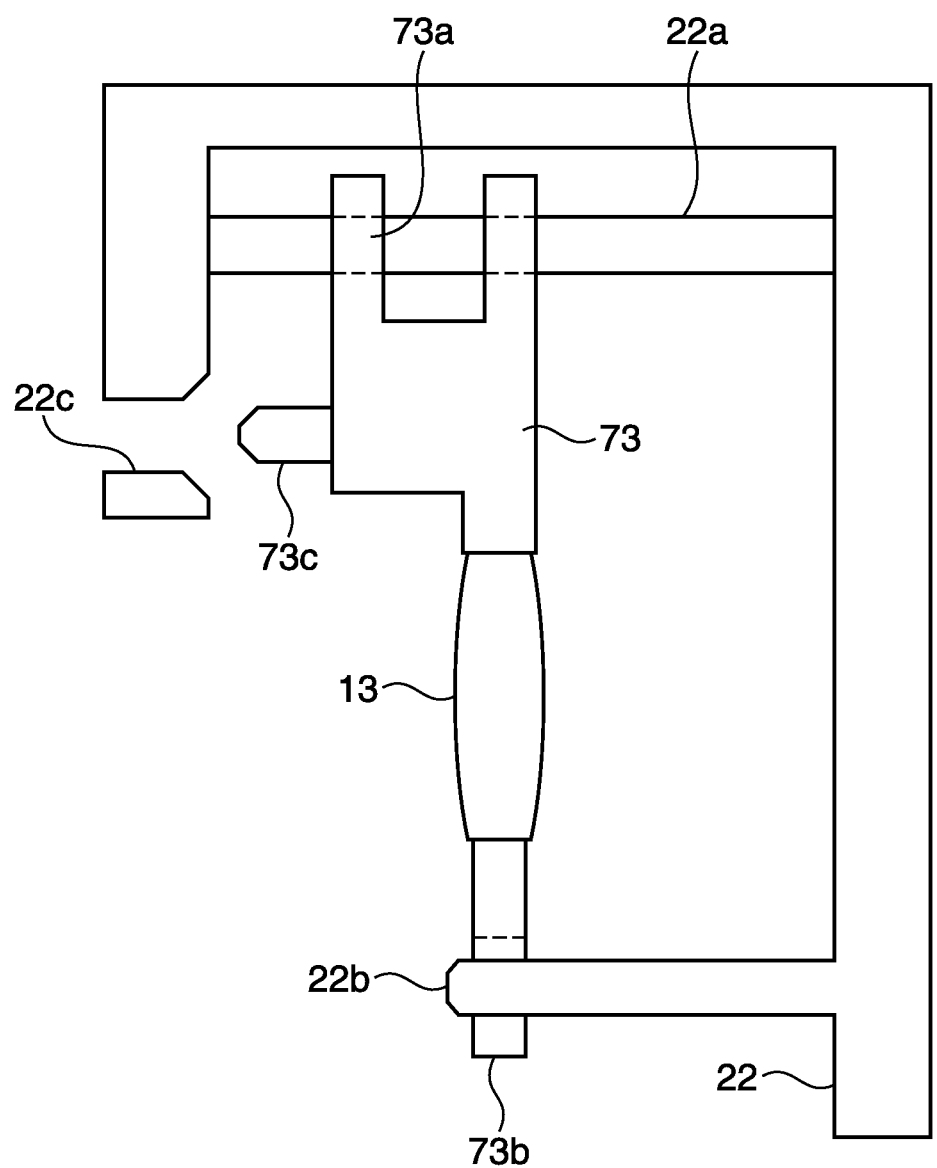
FIG. 14 is a schematic view showing a condition where a third group holder is most extended with respect to a sensor holder in the photographing position viewed from a lateral side in a digital camera according to a second embodiment of an image pickup apparatus equipped with the lens barrel of the invention.

FIG. 14 is a schematic view showing a condition where the third group holder 73 is most extended with respect to the sensor holder 22 in the photographing position viewed from a lateral side. This embodiment describes an example where the engagement length of the pivot regulating engagement portion 73b and the second guide shaft 22b in the optical axis direction is shorter due to restrictions of the internal structure of the lens barrel 10, etc.

Under the condition shown in FIG. 14, the pivot of the third group holder 73 is regulated by only the engagement of the pivot regulating engagement portion 73b with the second guide shaft 22b. Since the pivot of the third group holder 73 is not regulated by the regulation hole 22c and the shaft 73c at the time of usual photographing as shown in FIG. 14, an unnecessary interference object does not intervene between the third group holder 73 and the sensor holder 22.

Figure 15:
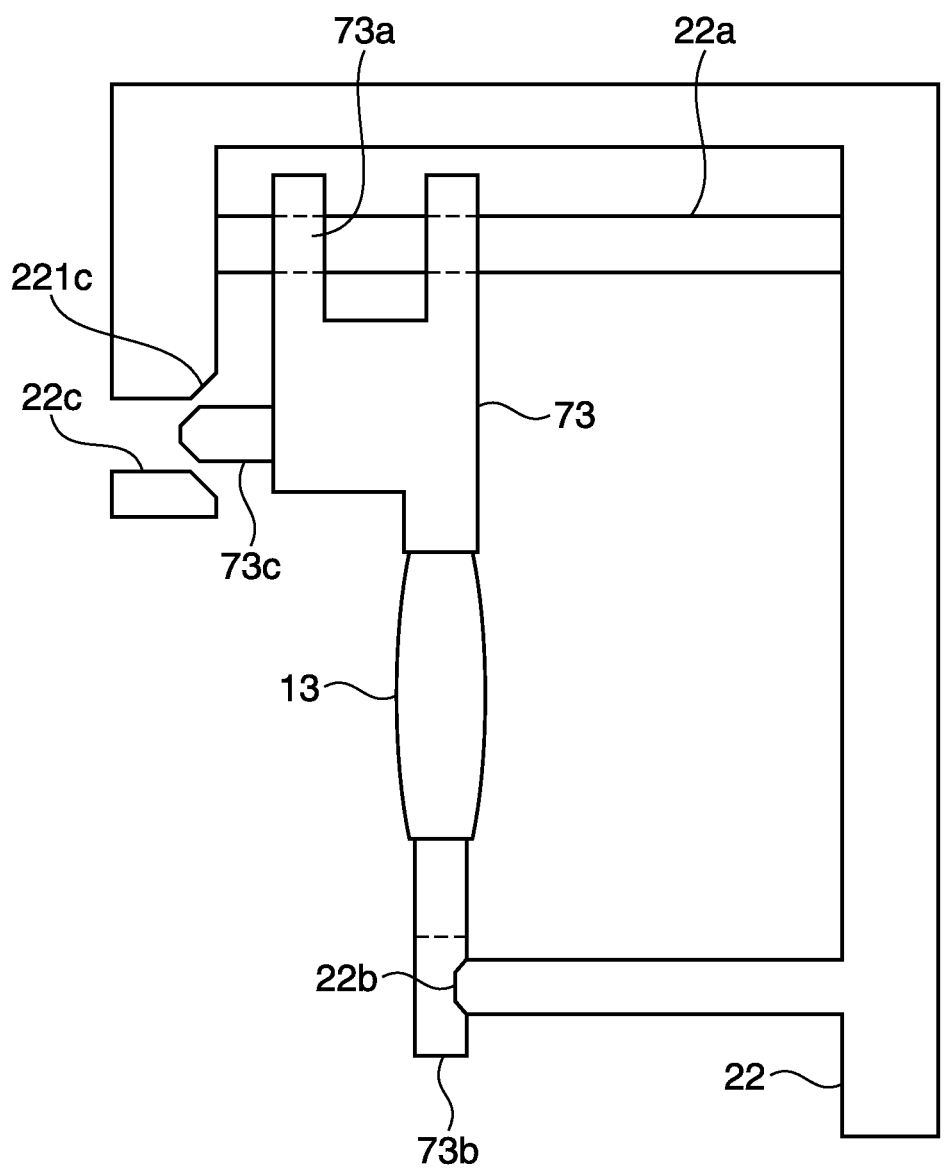
FIG. 15 is the schematic view showing a condition where the third group holder further moves to the extension side from the condition shown in FIG. 14 just before a pivot regulating engagement portion comes off a second guide shaft viewed from the lateral side in the digital camera according to the second embodiment.

FIG. 15 is the schematic view showing a condition where the third group holder 73 further moves to the extension side from the condition shown in FIG. 14 just before the pivot regulating engagement portion 73b comes off the second guide shaft 22b viewed from the lateral side.

Under the condition shown in FIG. 15, the pivot of the third group holder 73 is regulated by the engagement of the pivot regulating engagement portion 73b with the second guide shaft 22b. Moreover, the tip end of the shaft 73c is inserted into a chamfer 221c formed at an entrance area of the regulation hole 22c. Accordingly, the pivot of the third group holder 73 is also regulated by the engagement of the shaft 73c with the regulation hole 22c.

Figure 16:
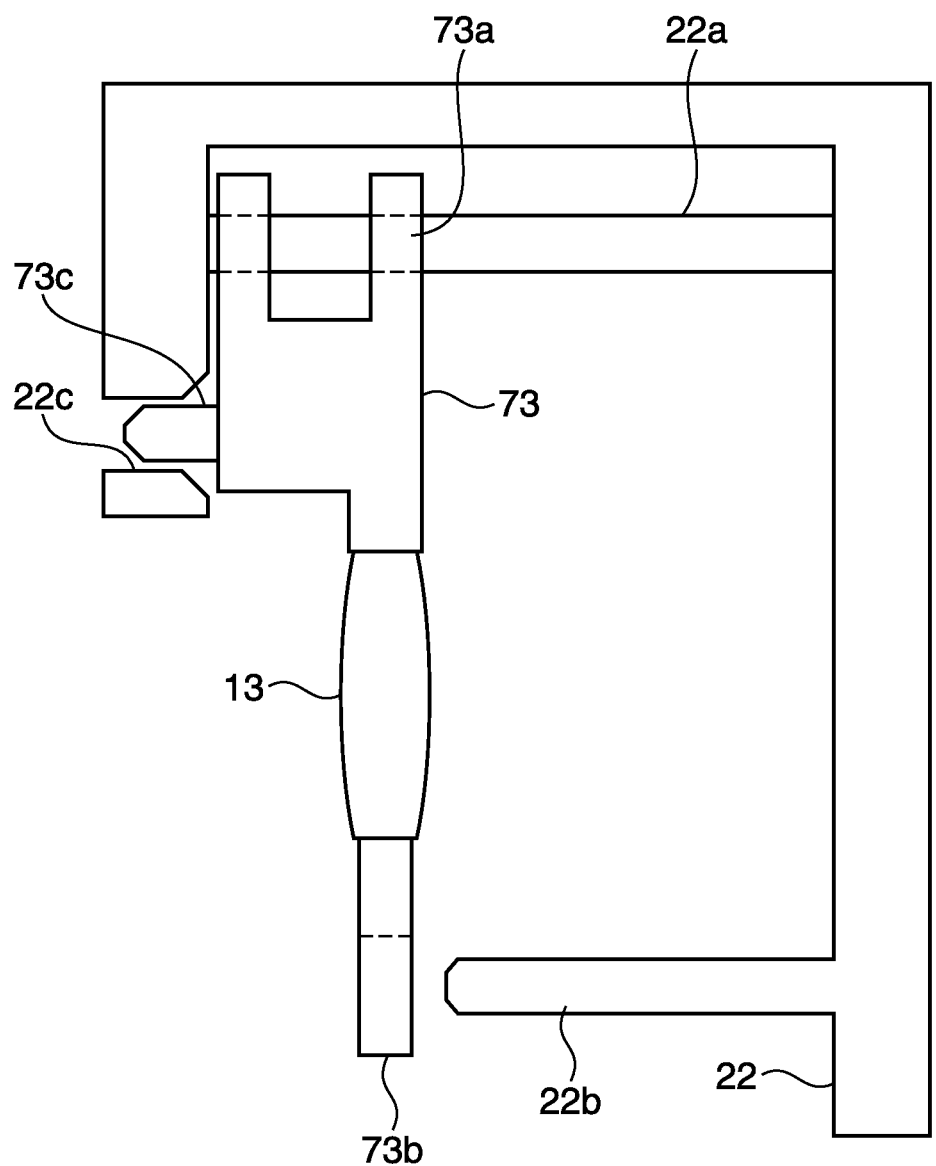
FIG. 16 is the schematic view showing a condition where the third group holder moves so as to run against an extended edge and the pivot regulating engagement portion comes off the second guide shaft viewed from the lateral side in the digital camera according to the second embodiment.

FIG. 16 is the schematic view showing a condition where the third group holder 73 moves so as to run against the extended edge and the pivot regulating engagement portion 73b comes off the second guide shaft 22b viewed from the lateral side.

Under the condition shown in FIG. 16, the pivot of the third group holder 73 is regulated by only the engagement of the shaft 73c with the regulation hole 22c. Moreover, as mentioned above, the gap between the regulation hole 22c and the shaft 73c is set up so that the pivot regulating engagement portion 73b can be fitted to the second guide shaft 22b even if the third group holder 73 is moved by the gap in the pivoting direction under the condition where the pivot regulating engagement portion 73b comes off the second guide shaft 22b. Accordingly, the third group holder 73 does not fall when the third group holder 73 returns to the condition in FIG. 15. The other configurations and operational effects are the same as that of the above-mentioned first embodiment.

Next, a digital camera according to a third embodiment of an image pickup apparatus equipped with the lens barrel of the invention will be described with reference to FIG. 17 to FIG. 19. It should be noted that sections duplicated or corresponding to sections in the above-mentioned first embodiment will be described by applying the same numerals in the drawings.

Figure 17:
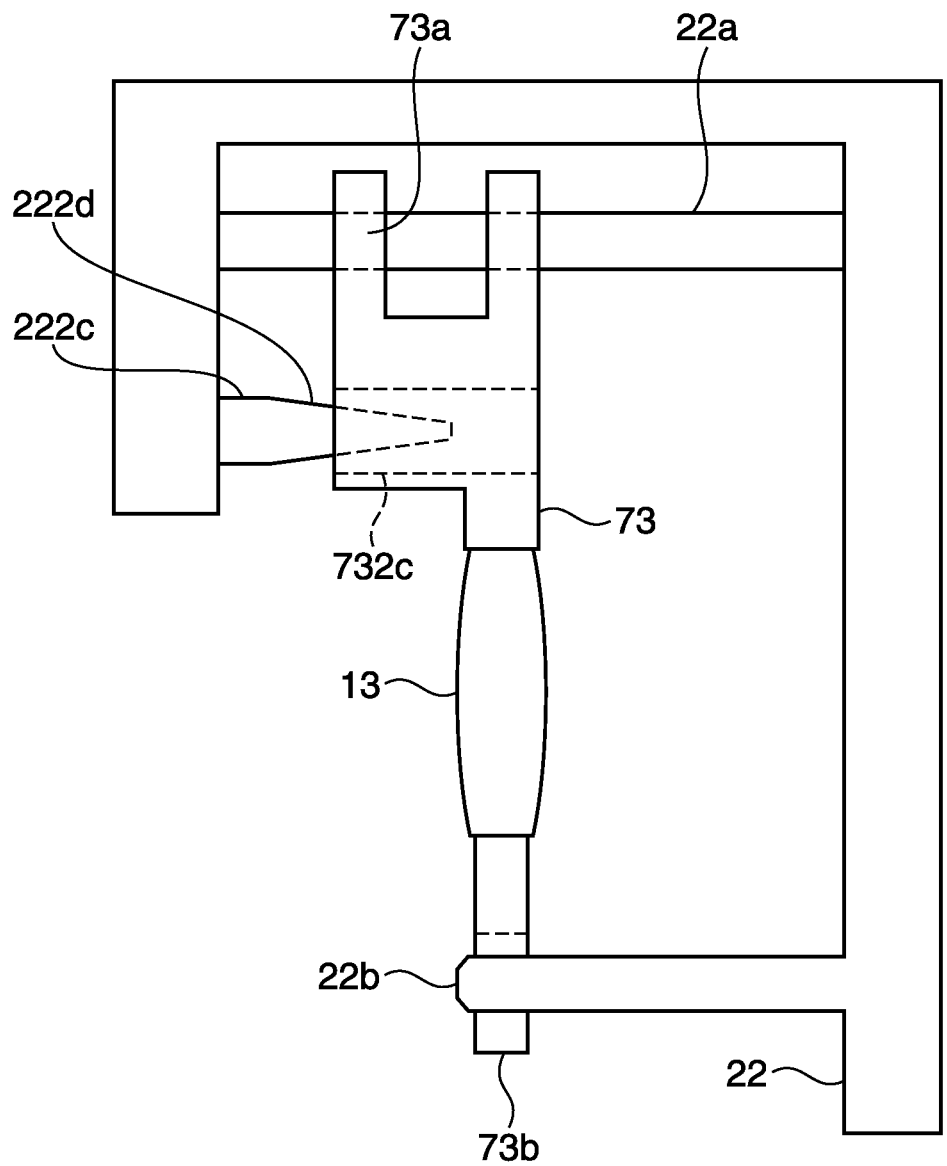
FIG. 17 is a schematic view showing a condition where a third group holder is most extended with respect to a sensor holder in the photographing position viewed from a lateral side in a digital camera according to a third embodiment of an image pickup apparatus equipped with the lens barrel of the invention.

FIG. 17 is a schematic view showing a condition where the third group holder 73 is most extended with respect to the sensor holder 22 in the photographing position viewed from the lateral side. In the third embodiment, the regulation hole 22c of the sensor holder 22 in the second embodiment is replaced with a regulation shaft 222c, and the shaft 73c of the third group holder 73 is replaced with a regulation hole 732c.

Under the condition shown in FIG. 17, the pivot of the third group holder 73 is regulated by only the engagement of the pivot regulating engagement portion 73b with the second guide shaft 22b. Moreover, although the tip end of the regulation shaft 222c is inserted into the regulation hole 732c, there is a comparatively large gap between the regulation shaft 222c and the regulation hole 732c because a taper 222d is formed at the tip end of the regulation shaft 222c. Accordingly, an unnecessary interference does not occur between the third group holder 73 and the sensor holder 22.

Figure 18:
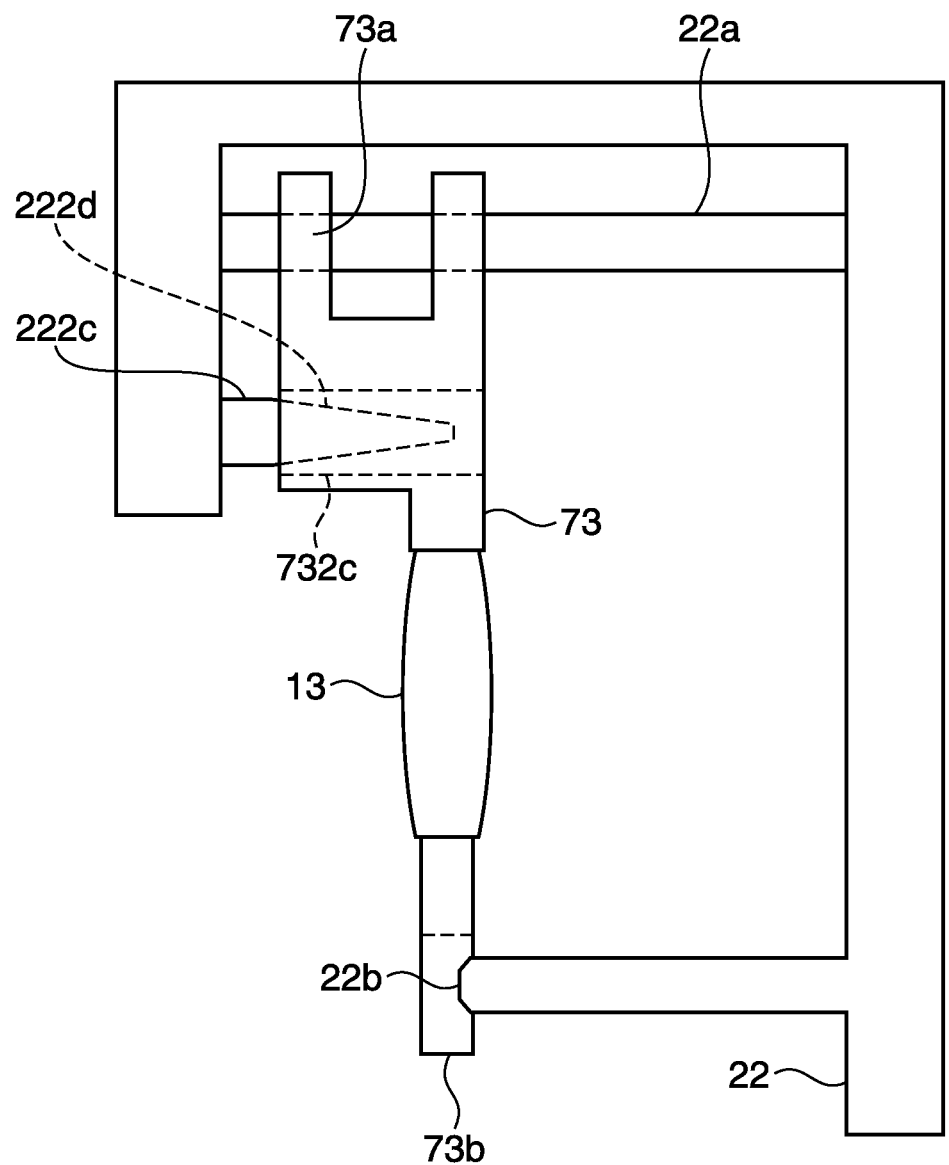
FIG. 18 is the schematic view showing a condition where the third group holder further moves to the extension side from the condition shown in FIG. 17 just before a pivot regulating engagement portion comes off a second guide shaft viewed from the lateral side in the digital camera according to the third embodiment.

FIG. 18 is the schematic view showing a condition where the third group holder 73 further moves to the extension side from the condition shown in FIG. 17 just before the pivot regulating engagement portion 73b comes off the second guide shaft 22b viewed from the lateral side.

Under the condition shown in FIG. 18, the pivot of the third group holder 73 is regulated by the engagement of the pivot regulating engagement portion 73b with the second guide shaft 22b. Moreover, the regulation shaft 222c is inserted into the regulation hole 732c up to the base portion. Accordingly, the pivot of the third group holder 73 is also regulated by the engagement of the regulation shaft 222c with the regulation hole 732c.

Figure 19:
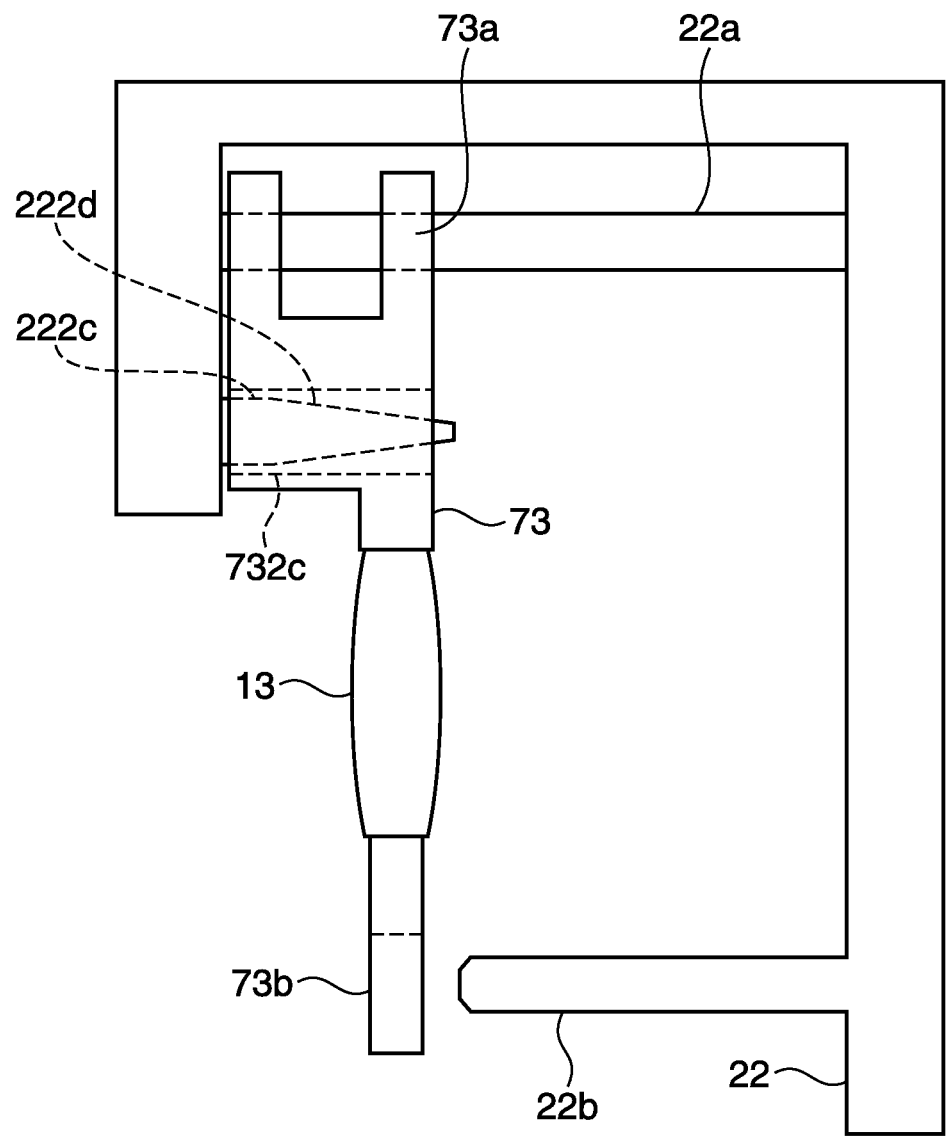
FIG. 19 is the schematic view showing a condition where the third group holder moves so as to run against an extended edge and the pivot regulating engagement portion comes off the second guide shaft viewed from the lateral side in the digital camera according to the third embodiment.

FIG. 19 is the schematic view showing a condition where the third group holder 73 moves so as to run against the extended edge and the pivot regulating engagement portion 73b of the third group holder 73 comes off the second guide shaft 22b of the sensor holder 22 viewed from the lateral side.

Under the condition shown in FIG. 19, the pivot of the third group holder 73 is regulated by only the engagement of the regulation shaft 222c with the regulation hole 732c. Moreover, there is a proper gap between the regulation shaft 222c and the regulation hole 732c in the same manner. The gap is set up so that the pivot regulating engagement portion 73b can be fitted to the second guide shaft 22b even if the third group holder 73 is moved by the gap in the pivoting direction under the condition where the pivot regulating engagement portion 73b comes off the second guide 22b. Accordingly, the third group holder 73 does not fall when the third group holder 73 returns to the condition in FIG. 18. The other configurations and operational effects are the same as that of the above-mentioned first embodiment.

It should be noted that the invention is not limited to what has been described in the above-mentioned embodiments, quality of the material, a shape, a size, a formation, the number of elements, arrangement locations, etc., can be changed suitably unless it is deviated from the scope of the invention.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-244906, filed Dec. 3, 2014, which is hereby incorporated by reference herein in its entirety.

What is claimed is:
1. A lens barrel comprising:
a lens holder that holds a lens and that is movable in an optical axis direction;
a fixing member that supports one end of a first guide shaft for guiding said lens holder in the optical axis direction and that supports a second guide shaft in a cantilever manner, the second guide shaft being shorter than the first guide shaft and regulating a pivot of said lens holder on the first guide shaft by engaging with said lens holder, said fixing member having a wall portion that supports the other end of the first guide shaft; and
a pivot regulating shaft that extends from said lens holder on an object side in the optical axis direction, and that is configured to regulate the pivot of said lens holder on the first guide shaft in a case where engagement between said lens holder and the second guide shaft is released,
wherein said wall portion has a regulation hole that receives said pivot regulating shaft, and
wherein in a case where said lens holder is most extended with respect to said fixing member in a photographing position of said lens holder, (a) when an impact is not applied to the lens barrel, said pivot regulating shaft is apart in the optical axis direction from said regulation hole of said wall portion, and (b) when an impact is applied to the lens barrel, said pivot regulating shaft engages with said regulation hole of said wall portion.

2. The lens barrel according to claim 1, wherein a gap between said regulation hole of said wall portion and said pivot regulating shaft extending from said lens holder is set up to be larger than a gap of an engagement portion between said lens holder and the second guide shaft.

3. The lens barrel according to claim 1, wherein said lens holder has a fitting hole into which the first shaft is fitted.

4. The lens barrel according to claim 3, wherein a gap between the first guide shaft and said fitting hole of said lens holder is set up to be larger than a gap of an engagement portion between said lens holder and the second guide shaft.

5. The lens barrel according to claim 1, wherein the lens barrel varies between a collapsed state and a photographing state, and wherein in a case where the lens barrel is in the photographing state, said pivot regulating shaft does not regulate the pivot of said lens holder.

6. The lens barrel according to claim 1, wherein said lens holder comprises:

a lens holding member that holds the lens;

a shaft holding portion that is arranged outside said lens holding member and that is supported so as to be movable in the optical axis direction with respect to the first guide shaft; and an arm that connects an outer periphery of said lens holding member with said shaft holding portion, wherein said pivot regulating shaft extends from said shaft holding portion.

7. The lens barrel according to claim 1, wherein the lens is a focus lens.

8. An image pickup apparatus equipped with a lens barrel, the lens barrel comprising:

a lens holder that holds a lens and is movable in an optical axis direction;

a fixing member that supports one end of a first guide shaft for guiding said lens holder in the optical axis direction and that supports a second guide shaft in a cantilever manner, the second guide shaft being shorter than the first guide shaft and regulating a pivot of said lens holder on the first guide shaft by engaging with said lens holder, said fixing member having a wall portion that supports the other end of the first guide shaft; and a pivot regulating shaft that extends from said lens holder on an object side in the optical axis direction, and that regulates the pivot of said lens holder on the first guide shaft in a case where engagement between said lens holder and the second guide shaft is released, wherein said wall portion has a regulation hole that receives said pivot regulating shaft, and wherein in a case where said lens holder is most extended with respect to said fixing member in a photographing position of said lens holder, (a) when an impact is not applied to the lens barrel, said pivot regulating shaft is apart in the optical axis direction from said regulation hole of said wall portion, and (b) when an impact is applied to the lens barrel, said pivot regulating shaft engages with said regulation hole of said wall portion.

9. The lens barrel according to claim 1, wherein a tip end of the second guide shaft is formed like a taper.

* * * * *